June 20, 1961 L. N. MILLER 2,989,383
SOLID ADSORBER
Filed Feb. 14, 1958 2 Sheets-Sheet 1
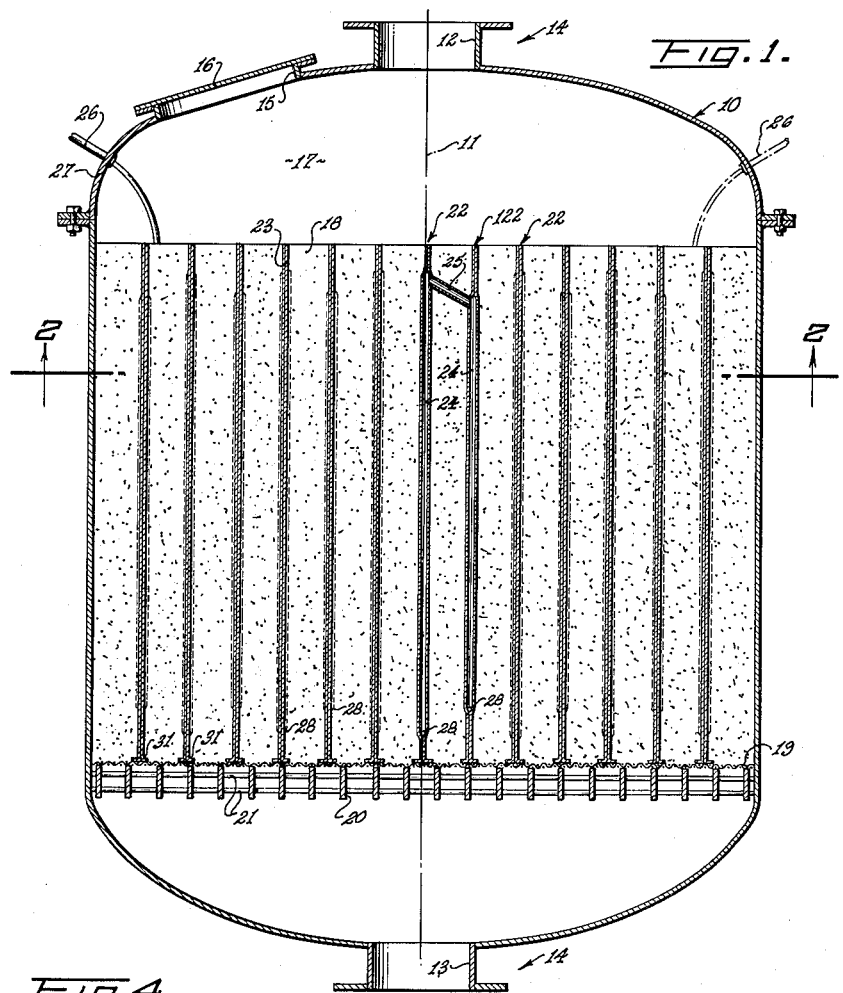
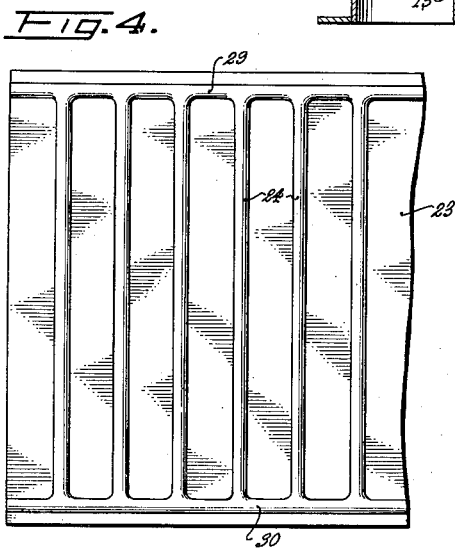
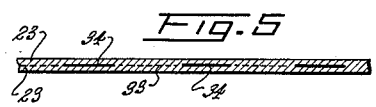
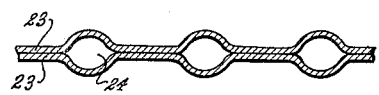
LOREN N. MILLER
INVENTOR.
BY
ATTORNEY June 20, 1961
L. N. MILLER
2,989,383
SOLID ADSORBER
Filed Feb. 14, 1958
2 Sheets-Sheet 2
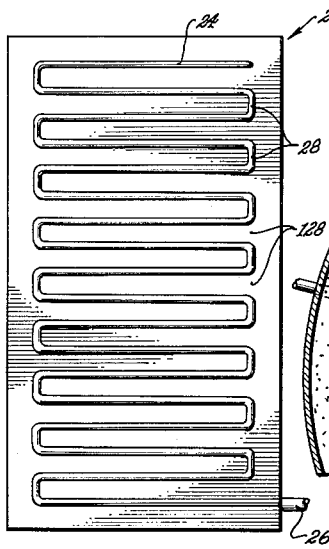
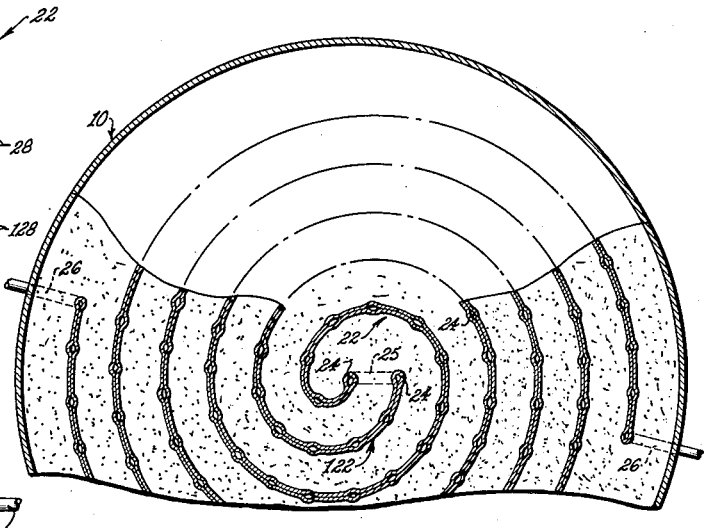
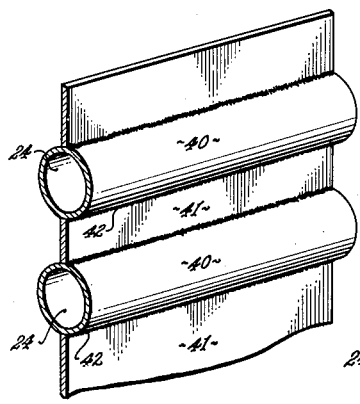
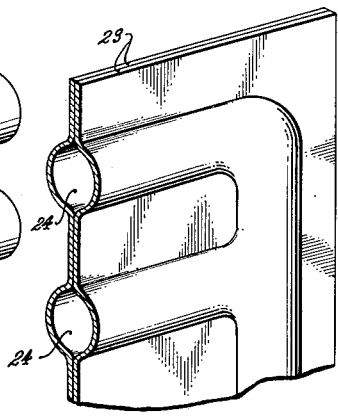
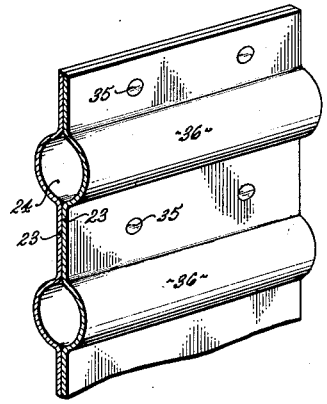
LOREN N. MILLER
INVENTOR.
BY
ATTORNEY

United States Patent Office 2,989,383
Patented June 20, 1961

2,989,383
SOLID ADSORBER
Loren Neil Miller, Whittier, Calif., assignor to The Fluor Corporation, Ltd., Los Angeles, Calif., a corporation of California
Filed Feb. 14, 1958, Ser. No. 715,427
4 Claims. (Cl. 23—288)

This invention relates generally to apparatus capable of subjecting fluid to adsorption, and more particularly has to do with the provision of controlled temperature adsorption equipment of improved design.

At the present time solid adsorption technology has been advanced through the successful laboratory application of solid adsorbents, such as molecular sieves, to isomer separation, sulfur removal, olefin recovery, and drying processes. However, commercial adsorption equipment, and particularly heat exchangers for transferring heat to or from adsorbents, has many disadvantages, among which are included insufficient heating or cooling capacity in relation to the size of adsorbent containing vessels, the lack of uniformity of heat transfer to or from the adsorbent, and high cost of conventional equipment, such as jacketed vessels, and tube bayonet or thimble heaters in adsorber vessels. As a result, solid adsorbers are little used commercially because of their high initial cost where indirect heat transfer is necessary to operation. The practical difficulties in providing heat transfer surface result from the fact that most good adsorbents, such as silica gel, activated alumina, charcoal and molecular sieves have what are considered good insulating properties, and as a result these adsorbents require heat transfer surfaces spaced extensively throughout the adsorbent or catalyst bed in order to provide economic feasibility of commercial adsorption processes using these catalysts. If heat transfer surface is not so extensively spaced, undesirable temperature changes will result from the heat of adsorption. Also, since the down time required for regeneration of the adsorbent is proportional to the heating surface available, and since the above adsorbents in many cases adsorb a fair percentage of their weight in liquids or gases during operation, it can be readily seen that commercial use of these catalysts is not economically possible unless the rate of heat transfer is sufficient to reduce the required down time to practical limits. Also, cooling and even refrigeration must be provided during certain adsorption operations, and similar heat transfer considerations limit the throughput of a given adsorber.

In an effort to overcome the above disadvantages associated with conventional commercial adsorption apparatus, I have provided an adsorber designed so that the rate of heat transfer to and from the adsorbent bed is markedly increased for a given sized adsorber vessel containing the catalyst, and furthermore so as to maintain the bed temperature substantially uniform throughout of the chamber in which the catalyst extends, with the result that the rate or capacity of adsorption is markedly increased while at the same time the adsorption process as respects fluid flowing through the apparatus is maintained uniform across the adsorbent cross section.

Accordingly, I provide a chamber, typically an unjacketed vessel having spaced inlet and outlet openings for flowing through the chamber fluid to be subjected to adsorption therein. A bed of permeable adsorbent material in the chamber is embedded by a heat exchanger assembly including metallic sheet or sheets extending in the direction of flow through the chamber and also laterally therein, the exchanger assembly containing sufficient internal passages distributed crosswise of the chamber and extending vertically for passing other fluid in heat exchange relation with the metal sheets and adsorbent bed to maintain the bed temperature substantially uniform throughout thereof. Finally, I provide spaced supports mounting the assembly and adsorbent substantially to fill the chamber cross section so that all fluid flowing through the chamber is adapted to permeate substantially uniformly the adsorbent.

The passages typically extend vertically in the direction of fluid flow through the chamber, and they may be in series or parallel communication. Also, the sheets and passages may extend in a vertically convoluted plane so as to distribute the passages substantially uniformly through the catalyst bed. I preferably, but not necessarily, form the passages by expanding under fluid pressure the unbonded portions of a pair of superposed metal sheets that have been interruptedly pressure bonded in the manner described in U.S. Patent No. 2,690,002, or in U.S. Patent No. 2,212,481, as will be described. Such bonding procedures when used on the particular shapes contemplated can result in reducing the cost of installed heat exchange surface to a small portion of that required for conventional heat exchange. Much of this saving can also be effected by producing the shapes contemplated by embossing or other methods. However, I do not wish to be limited to this form of heat exchanger fabrication, and therefore I contemplate the use of other similar forms which will be described.

These and other features and objects of the invention, as well as the details of an illustrative embodiment, will be fully understood from the following detailed description of the drawings, in which:

FIG. 1 is a vertical section showing in elevation the adsorber design and construction;

FIG. 2 is a section taken on line 2—2 of FIG. 1;

FIG. 3 is a plan view of one of the plate heat exchanger assemblies prior to forming the latter as a spiral or convolute;

FIG. 4 is a view similar to FIG. 3 but showing a modified passage configuration in the heat exchanger which provides parallel instead of series flow through the tubes;

FIG. 5 is a view showing roll bonded sheets prior to expansion of passages therein to form the passageway configuration in the heat exchanger assembly;

FIG. 6 is a view similar to FIG. 5 showing the sheets after expansion of the passages therein;

FIG. 7 is a perspective view of a fragmentary portion of the heat exchanger assembly formed by roll bonding and interruptedly expanding two metal sheets;

FIG. 8 is a view similar to FIG. 7 showing a series of half tubes embossed on two plates which are then joined by spot welding or other means; and FIG. 9 is a view similar to FIG. 8 showing a series of tubes and plates welded togethr to form the heat exchange assembly.

In FIG. 1 an unjacketed adsorber vessel 10 is shown having its axle 11 extending upright, with inlet and outlet openings 12 and 13 formed by flanges 14 at the top and bottom of the vessel, respectively. A suitably enlarged opening 15 covered by a removable plate 16 near the top of the vessel is provided to give access to the interior chamber 17. The fluid to be subjected to adsorption is passed through the upper and lower openings 12 and 13.

A solid bed 18 of permeable adsorbent material is shown extending across the chamber 17, the fixed catalyst bed typically comprising silica gel, activated alumina, charcoal, or what is known as a molecular sieve material. Bed 18 is also representative of a granular catalyst which may be on an adsorbent type base for example of the above listed varieties, a representative catalyst being barium chloride as used for promoting the reaction of hydrogen chloride with acetylene. The vertical extent of the bed is uniform crosswise of the chamber 17 so that the fluid passed vertically through the chamber may be subjected to uniform adsorption. The bed is supported by a screen 19 which is in turn mounted by a series of laterally spaced parallel cross members 20 carried by the vessel walls, with two or more supporting rods 21 extending crosswise through the members 20, as shown.

Embedded in the catalyst is a heat exchanger assembly comprising two pairs 22 and 122 of superposed interconnected metal sheets 23 extending vertically and laterally and wound in convolute or spiral shape as better illustrated in FIG. 2, with the sheets having surface-to-surface contact with the catalyst 18. The interconnected sheets contain between them a large number of relatively small internal passages 24 which extend vertically throughout the major vertical extent of the catalyst bed, the passages 24 in cross-section being distributed substantially uniformly throughout the bed, as viewed in FIG. 2. The two parallel extending convoluted heat exchangers 22 and 122, the turns of which have uniform spacing in a radial direction, have vertical passages 24 close to the axis 11 that are interconnected by a jumper tube 25 so as to transfer heating or cooling fluid between the exchangers. The latter fluid enters and leaves the passages at the outer convoluted portions of the heat exchangers through ducts 26 which pass throughout head 27 of the reactor vessel, so that uniform circulation of heating or cooling fluid through the catalyst bed may be achieved.

The vertical passages 24 are interconnected by return bends or horizontal passages 28 as seen in FIG. 3 so that fluid may flow in series through all the vertical and horizontal passages. To prevent bridging or upward bulging of the catalyst in the areas 128 between return bend passages on radially spaced successive turns of the two heat exchanger assemblies, the passages 28 on the two assemblies are at different vertical elevations as shown in FIG. 1. As a result, there is little or no tendency of the adsorbent to arch or bridge between the passages 128 so as to form short circuits attracting flow of fluid in a non-uniform manner through the catalyst bed. Furthermore, fluid to be subjected to adsorption has nearly uniform velocity through the bed since there are no variations in the lateral spacing in a vertical direction between any two successive turns of the heat exchangers. Therefore, the fluid is subjected to uniform adsorption as it flows vertically through the adsorber and permeates the adsorbent.

In FIG. 4 is shown a somewhat modified passageway configuration, wherein all of the vertical passages 24 communicate with the same top and bottom horizontal passageways 29 and 30, so that the latter horizontally extending passages are in parallel communication with the vertical passages 24. This tube and plate configuration also provides for indirect uniform heating or cooling of the adsorbent bed, when hot or cool fluid is passed through the heat exchanger assembly. Also, the plates 23 in which the passages are formed may be rolled into a pattern, typically, but not necessarily, a scroll, so as to provide for uniform heat transfer to the catalyst bed.

The heat exchanger scroll 22 may be supported on the screen 19 shown in FIG. 1 by flanges 31 typically formed by flaring and rolling the lower edge portions of the sheets 23 so that the flanges extend laterally and distribute the weight of the exchangers over the screen. Of course, the cross members 20 support the exchanger assembly through the screen so that the latter is not cut or otherwise damaged by the weight of the assembly. By thus mounting the exchanger scroll without attaching it to the screen or supports 20, considerable savings in installation costs may be realized.

In FIGS. 5 and 6 are shown one method of forming the internal passages 24 between a pair of metal sheets 23, according to the methods described in the patents referred to in the introduction. As contemplated, the method involves pressure bonding together, as for example by hot rolling, the two metal sheets 23 at interrupted locations 33 between which bonding of the sheets is prevented by the insertion of weld preventing material 34 extending between the sheets in the passageway configuration indicated in FIGS. 3 and 4. Such weld preventing material may typically comprise wax or a mixture of graphite in water glass, and the roll bonding process has the effect of enlarging the lateral dimension of the unexpanded passageways. Expansion of the latter as by the introduction of fluid pressure may then be carried out to outwardly and permanently deform the metal overlying the passages indicated at 24 in FIG. 6, thereby forming the relative small cross section passages desired.

It is contemplated that the average diameters of the passages 24 may be in the range ¼ inch to 2 inch, size selection being determined from considerations of pressure drop in the fluid passing through the catalyst bed, and pressures thereof, it being desired that any pressure drop be uniform as the fluid passes vertically through the catalyst bed, and preferably at constant velocity. It is also contemplated that the tubed areas of the plates 23 indicated at 24, 28 and 29 in FIGS. 3 and 4 should comprise from 10 to 50 percent of the total plate area, and that the spacing of the vertical tubed areas 24 should be such as to provide for uniform heat transfer from fluid in the passages to the sheets and then to the catalyst in contact with the sheets, or vice versa. Parallel arrangement and interconnection of the vertical passages 24 as indicated in FIG. 4 is recommended where the heat transfer agent passing through the passages comprises a boiling or condensing liquid; whereas, the passages would preferably be connected in series as indicated in FIG. 3 in those instances where a gaseous heat transfer agent is to be passed through the exchanger.

In FIGS. 7 through 9 are shown in perspective several alternate methods of forming the interconnected tube and plate combinations, FIG. 7 illustrating the roll bonded plates 23 having passages 24 expanded between the plates as previously described in connection with FIGS. 1 through 6. In FIG. 8 a series of embossed tube in sheet combinations are connected together as by the spot welding indicated at 35, each tube 36, forming an internal passage 24, being itself formed by pressure expansion of the sheet metal overlying the unbonded area between the two sheets 23. Thereafter, the two sheets 23 are spot welded together, as indicated, to form the complete exchanger assembly. Another method of forming the assembly is shown in FIG. 9, wherein a series of metal tubes 40 are interconnected by separate metal sheets 41 welded to the tubes as indicated at 42.

The adsorber design is particularly adapted to catalytic reactors wherein essentially isothermal operation is desired, and the catalyst consists at least in major part of a substance commonly used for adsorption. An example is the use of activated carbon on which metal salts have been placed for the production of vinyl chloride from acetylene and hydrogen chloride. The adsorber design is also effective for catalytic reactions where the catalyst is in an adsorbant type base and the heat of reaction is sufficiently exothermic or endothermic as to require a substantial amount of heat transfer surface to maintain desired operating temperatures.

It is also contemplated that deformation of the metal overlying the internal passages 24 so as to form the latter may be accomplished by embossing the metal plates 23, which themselves may be interconnected by seam or spot welds.

I claim:

1. Apparatus of the character described, comprising an upright chamber having vertically spaced inlet and outlet openings for flowing through the chamber first fluid to be subjected to adsorption therein, a solid vertically deep bed of permeable adsorbent material having substantially uniform vertical extent in the chamber, the chamber above and below said bed being open to communicate with the respective openings so that said first fluid flows vertically through the bed, a heat exchanger assembly in the form of vertically open scroll means embedding said adsorbent and including metal sheet extending vertically and laterally in surface-to-surface contact with the adsorbent, said sheet containing a large number of relatively small internal intercommunicating passages for passing other fluid in heat exchange relation with said sheet and adsorbent bed to maintain the bed temperature substantially uniform horizontally crosswise of the chamber, the major lengthwise extents of said intercommunicating passages extending in the vertical direction of first fluid flow through said adsorbent bed and throughout the bed major depthwise extent, said sheet extending laterally and continuously between the passages in said bed, the lengthwise extents of said passages being distributed substantially uniformly in horizontally relatively closely spaced apart relation crosswise of the chamber, and support means mounting said assembly and adsorbent substantially to fill the cross section of said chamber throughout the vertical extent of said adsorbent whereby all fluid flowing through said chamber is adapted to permeate substantially uniformly said adsorbent, said passages having horizontal extents communicating with lengthwise vertical extents of the passages, said passage horizontal extents in radially sequentially spaced scroll convolutions being at different elevations.

2. The invention as defined in claim 1 in which the vertical and horizontal passage extents are in series communication.

3. The invention as defined in claim 1 in which the horizontal extent of the passages are in parallel communication with the vertical extents of said passages.

4. The invention as defined in claim 1 in which said scroll means includes a first and second vertically open scrolls interfitting and spaced from one another.

References Cited in the file of this patent

UNITED STATES PATENTS

| | | |
|---|---|---|
| 1,036,609 | Grosvenor | Aug. 27, 1912 |
| 2,083,732 | Moore | June 15, 1937 |
| 2,291,762 | Samans | Aug. 4, 1942 |
| 2,306,011 | Buch | Dec. 22, 1942 |
| 2,329,658 | Simpson | Sept. 14, 1943 |
| 2,690,002 | Grenell | Sept. 2, 1954 |